Jan. 1, 1963   J. G. JENNE   3,071,487
METHOD FOR PRODUCING DECORATIVE SURFACE COVERINGS
Filed June 10, 1959   4 Sheets-Sheet 2
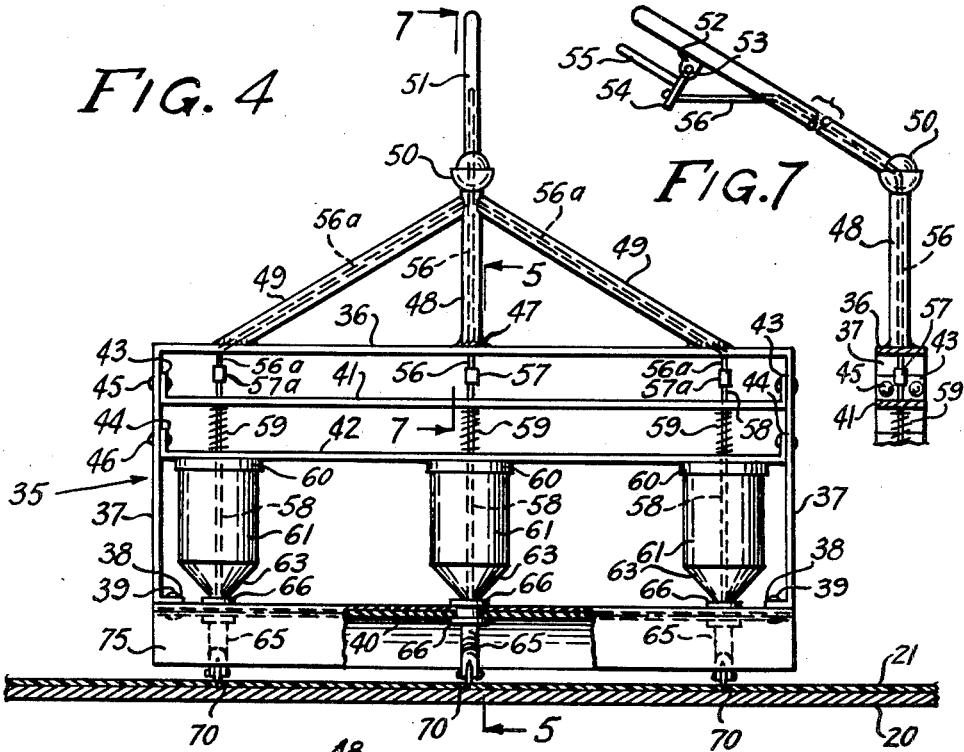
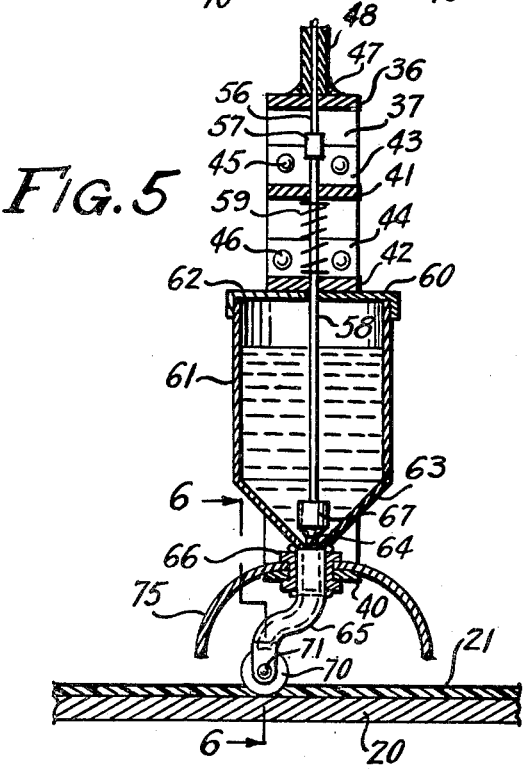
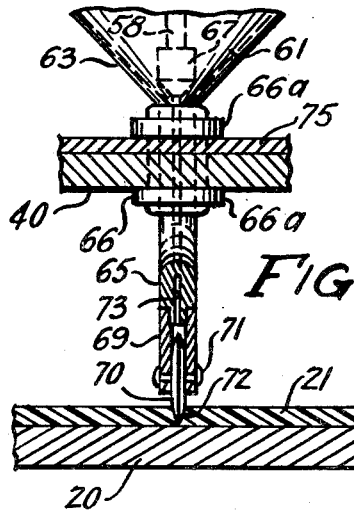
INVENTOR.
JOHN G. JENNE
BY
Robert L. Dennison
ATTORNEY Jan. 1, 1963 J. G. JENNE 3,071,487
METHOD FOR PRODUCING DECORATIVE SURFACE COVERINGS
Filed June 10, 1959 4 Sheets-Sheet 3
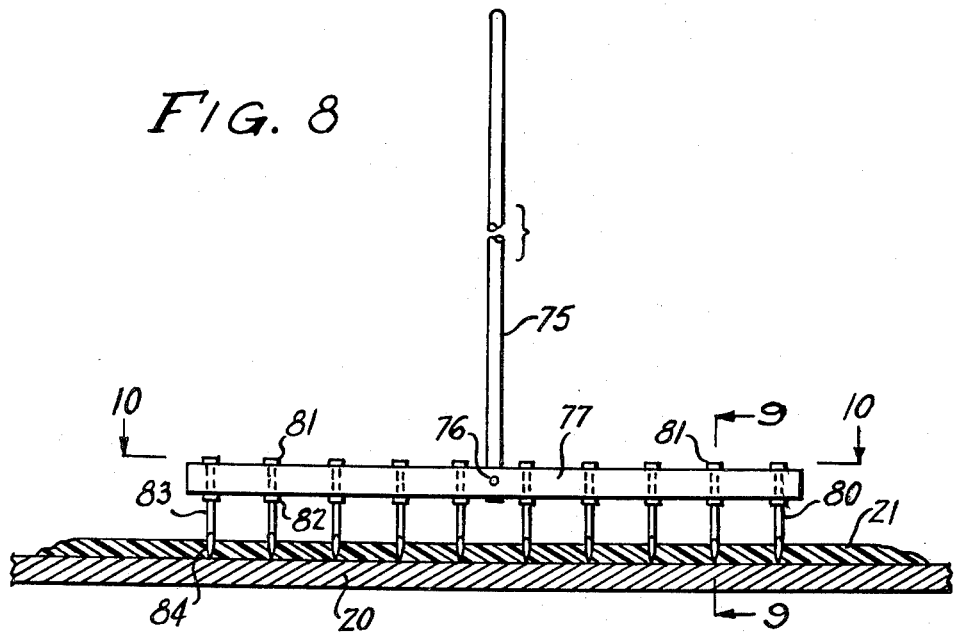
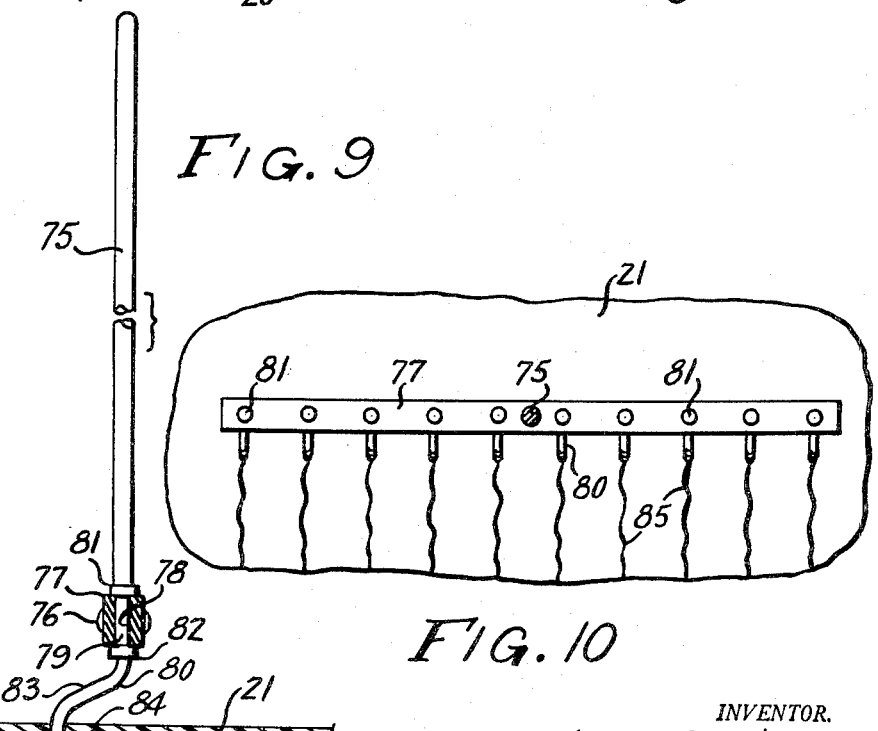
INVENTOR.
JOHN G. JENNE
ATTORNEY United States Patent Office 3,071,487
Patented Jan. 1, 1963

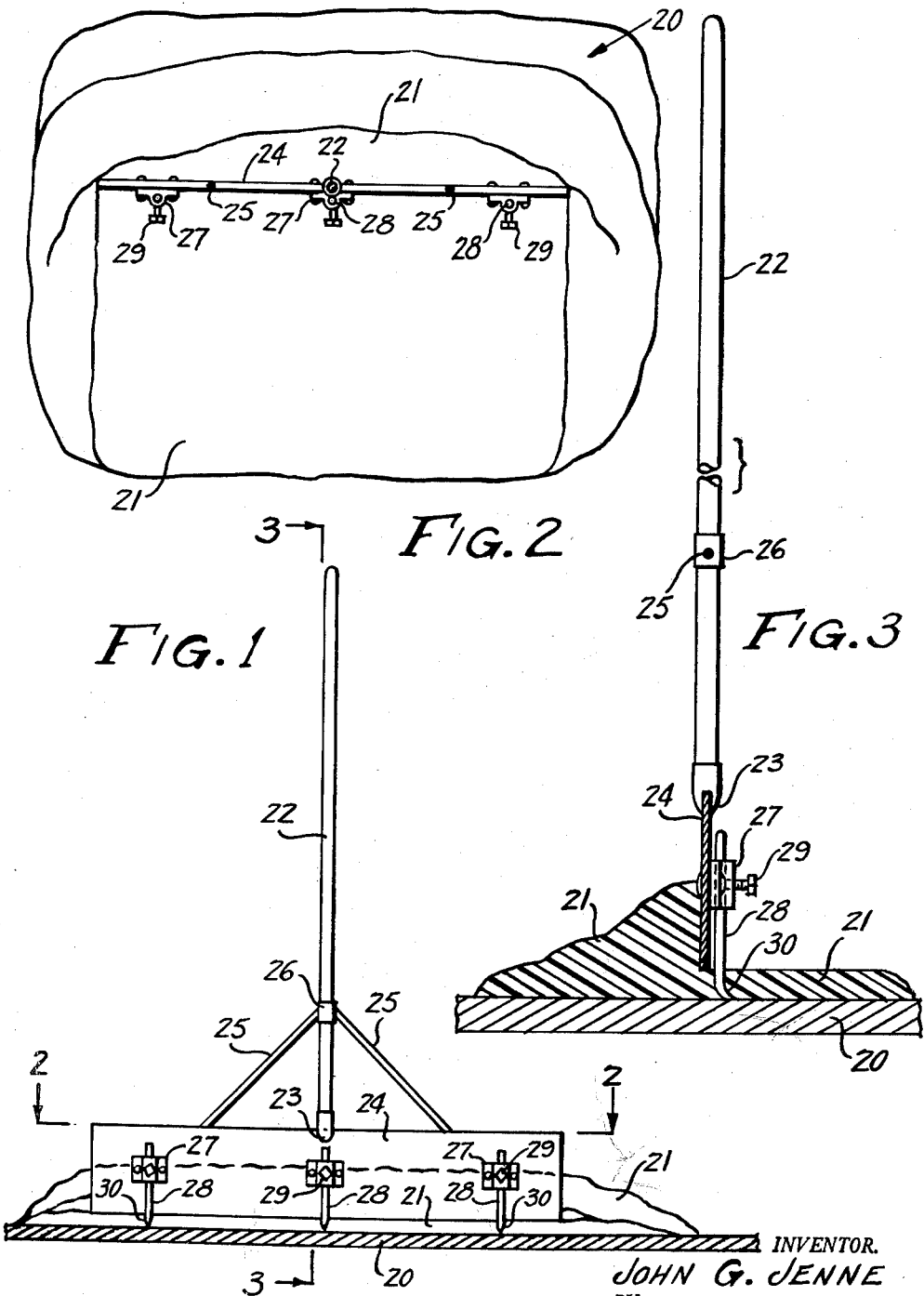

3,071,487
METHOD FOR PRODUCING DECORATIVE SURFACE COVERINGS
John G. Jenne, Toronto, Ontario, Canada
(58 Clarion Road, Weston, Ontario, Canada)
Filed June 10, 1959, Ser. No. 819,367
8 Claims. (Cl. 117—10)

This invention relates to an improved method of producing a decorative surface, and has particular application to floor or wall surfaces.

The primary object of the invention is the provision of an improved method of applying a viscous self-hardening covering to a floor or wall or the like surface, scoring or incising the coating while still viscid, simultaneously applying one or more colors distinct from the base coloring to the incisions, the coloring preferably being liquid and of a viscosity less than the base composition, so that it will float to the surface of the base composition prior to hardening, subsequently further scoring the admixed base and coloring composition to further admix the diverse colors in random patterns and allowing the composition, after smoothing, to harden.

An additional object of the invention is the provision of such a method or process wherein the base composition preferably comprises a suitable epoxy resin suitably colored, which may be provided with a filler such as quartz, or asbestos fibre, or "kaolin" talcum, zirconium, aluminum, chrome-oxide, titanium dioxide, calcium carbonate or the like.

An additional object of the invention is the provision of such a process wherein the base composition comprises any suitable paint-like viscous composition, which may be conveniently applied by a brush or trowel in one color, but in which additional coloring matter admixed at random to provide a marble-like or granite-like pattern may be readily introduced.

An additional object of the invention is the provision of an improved highly decorative floor covering which is characterized by high wear resistance, extreme durability, simplicity and expedience of application, and high ornamental value.

An additional object of the invention therefore resides in the individual steps comprising the method, in their sequential application, and in their composite result.

Still other objects will in part be obvious, and in part be pointed out hereinafter as the description of the invention proceeds, and disclosed in the accompanying drawings.

In the drawings:

FIGURE 1 is a front elevational view of one form of tool particularly adapted for accomplishing one of the steps of the method of the instant invention.

FIG. 2 is a sectional view taken substantially along the line 2—2 of FIG. 1 as viewed in the direction indicated by the arrows.

FIG. 3 is an enlarged sectional view, partially broken away, taken substantially along the line 3—3 of FIG. 1 as viewed in the direction indicated by the arrows.

FIG. 4 is a front elevational view, partly broken away, of another tool employed in carrying out steps of the method.

FIG. 5 is an enlarged sectional view taken substantially along the line 5—5 of FIG. 4 as viewed in the direction indicated by the arrows.

FIG. 6 is an enlarged sectional view taken substantially along the line 6—6 of FIG. 5 as viewed in the direction indicated by the arrows.

FIG. 7 is an enlarged sectional view taken substantially along the line 7—7 of FIG. 4 as viewed in the direction indicated by the arrows.

FIG. 8 is a front plan view, partially broken away, of still another tool which may be employed in carrying out the steps of the method of the instant invention.

FIG. 9 is an enlarged sectional view partially broken away, taken substantially along the line 9—9 of FIG. 8 as viewed in the direction indicated by the arrows.

FIG. 10 is a sectional view taken substantially along the line 10—10 of FIG. 8 as viewed in the direction indicated by the arrows, and disclosing the irregular scoring of the base composition, and, FIG. 11 is a top plan view of an illustrative design achieved by the method and apparatus of the instant invention.

Similar reference characters refer to similar parts throughout the several views of the drawings.

Figure 11:

Having reference now to the drawings in detail, and more particularly to FIGS. 1, 2 and 3, there is generally indicated at 20 a floor, which may comprise any suitable smooth surface, such as wood, stone, cement, composition or other suitable flooring material. The method of the instant invention will hereinafter be described as applied to such a floor, although it is to be understood that it is equally applicable to walls, roofs, under certain conditions, ceilings, or other suitable plain surfaces.

The flooring 20 has applied thereto a covering, 21, which is suitably positioned thereon in any desired conventional manner, and which is preferably comprised of a viscose composition of epoxy resin, which may or may not contain a filler, such as quartz powder, asbestos fibre, "kaolin," talcum, comminuted iron particles, zirconium, aluminum, chrome-oxide, titanium dioxide, calcium carbonate, or the like, and a suitable coloring material.

The composition is applied in a fluid viscose state, and may be of a self-hardening nature, or of a type to be suitably hardened by means of a suitable chemical catalyst or the like.

After the composition is initially applied, it is smoothed in any desired manner, although a smoother or scraper such as shown in FIGS. 1 to 3 may be conveniently employed.

The scraper includes a handle 22 which is suitably secured as at 23 to an elongated flat blade 24, reinforcing members 25 extending diagonally from a collar 26 to suitable intermediate points of the blade.

The blade may be of any desired length for convenient handling, and has preferably secured thereto one or more mounting brackets 27, each provided with a vertical bore for the reception of a scribing point 28. Set screws 29 are extended through suitable threaded apertures in the members 27 for holding the points in position, and regulating their extending length.

Each scribing point 28 terminates in an arcuate pointed tip 30, the arrangement being such that the points 30 are extended through the composition, and serve not only as spacers for the blade 24 for the proper determination of the applied thickness of the base coating 21, but also to striate or score the material for proper admixture, or for the subsequent application of coloring as will be described hereinafter.

After a suitable quantity of the base composition, which may be of a single uniform color or of two or more different colors admixed to the extent of providing stratification but not completely, the next step of the process may be carried out with the apparatus shown in FIGS. 4 to 7 inclusive.

The apparatus of FIG. 4 comprises a color applicator, and includes a frame generally indicated at 35, which includes a top plate or bar 36 having depending integral end plates 37. The lower ends of the member 37 are inturned as at 38 and have secured thereto as by means of rivets 39 a base plate or bar 40. Two equidistantly spaced intermediate bars 41 and 42 are provided adjacent the upper portions of legs 37, and include upwardly turned ends 43 and 44 respectively, which are secured in any desired manner as by rivets or bolts 45 and 46 to the inner sides of legs 37.

The top of upper plate 36 has secured thereto in any desired manner as by welding 47, a central tubular handle member 48, and two diagonally disposed tubular handle extensions 49. The upper portion of handle member 48 is provided with a friction-tight universal joint 50 from which extends an upper handle member 51. Adjacent the outer end of the member 51 is a bracket 52 to which is pivotally secured as by means of a pivot 53 a supplemental handle grip 54 provided with a hand-engaging extension 55. A flexible wire or cable 56 extends from the end of the handle member 54 through a suitable opening in handle 51 downwardly through tubular member 48. Suitable extensions 56a are fixedly secured to the flexible cable or wire 56 and extend downwardly through the members 49, and through suitable openings in the plate 36. The wires 56 and 56a are suitably secured by means of unions 57 and 57a respectively to vertical rods 58 which extend downwardly through aligned openings in the transverse horizontal members 41 and 42, springs 59 interposed between plate members 41 and 42 serving to bias the rods 58 downwardly for a purpose to be more fully described hereinafter.

Secured to the under side of transverse member 42 are a plurality of flanged cover members 60, which are adapted to cover paint-containing receptacles 61. The cover 60 may be of any desired type, and may be provided with separable half-sections 62 to permit the filling of the receptacles 61. The lower portions of each of the containers 61 are funnel-shaped as indicated at 63, and provided with bottom openings 64 which extend into hollow tubular gooseneck members 65. The members 65 are rotatably mounted as by means of bushings 66 extending through suitable openings in base member 40 and provided with collars 66a at the upper and lower ends thereof to hold the bushings in place.

Valve members 67 are positioned interiorly of each of funnel-shaped portions 63, and are secured to the ends of rods 58, the arrangement being such that movement of handle member 55 through wires 56 and 56a and rods 58 serves to open the valves 67 to permit colored liquid to flow through the openings into the gooseneck members 65. Obviously upon release of handle member 55, springs 59 bias the valves 67 to closed position.

The lower end of each gooseneck member is bifurcated to provide legs 69 between which is mounted, in each instance, a disc or wheel 70 on an axle 71. Each wheel 70 is provided with a beveled cutting edge 72 which is adapted to score or scribe the coating composition 21 simultaneously with the application of vari-colored paints through the opening 73 in the gooseneck 65. An arcuate shield 75 is provided which extends the full width of base plate 40 and overlies the goosenecks, for the purpose of preventing possible paint splatter, and also as a visible aligning device for the operator.

In the use and operation of the device the receptacles 61 are filled with liquid paint of any desired color or colors, and the handle portion 51 preset to a desired angle and inclination for convenience of the operator. The entire assembly is then moved at random over the base coating composition while the operator by means of a handle 55 holds the valves 67 in open position. The sharp edges 72 of the discs 70 score or scribe the viscous coating composition 21 and simultaneously liquid coloring matter passes through the openings 73 into the grooves or channels formed by the cutting edges 72. The device may be moved in any desired direction, forwardly or rearwardly, or laterally or in circles, and the goosenecks 65 will provide a variegated non-repetitious color pattern in the design in accordance with their individual pre-swivelling random movements. Since the coloring matter is preferably both less viscous and of lesser specific gravity than the base composition 21, after its initial application to the bases of the grooves or channels formed by the cutting discs 70, it will tend to diffuse upwardly and unevenly through and over the base coating composition 21 as such channels are closed by the flow of material. While such coloring matter is preferably of lesser viscosity and specific gravity than the base composition 21, it may of course be of any specific gravity or viscosity desired.

After this step in the process, the material may be allowed to harden, or, while the material is still fluid, additional agitation and diffusion of the colors may be provided by further scoring the surface with any desired implement, such as a conventional rake, although preferably a tool such as shown in FIGS. 8 to 10 is employed for this final step.

The implement shown in FIGS. 8 to 10 inclusive includes a handle 75 to the lower end of which is secured in any desired manner as by a pin or rivet, 76, an elongated cross bar 77. The cross bar 77 is provided with a plurality of vertical bores 78 in each of which is mounted a vertical upright portion 79 of a scribing point 80. Upper and lower collars 81 and 82 respectively mount the points 80 for free swivelable rotation in the bore 78. Each point 80 includes an offset or gooseneck portion 83 and terminates in a sharply tapered pointed end portion 84 in substantial alignment with the portion 79, which is adapted when in use, to further score the base coating composition 21 in a variety of irregular lines 85 as shown in FIG. 10.

After this final scoring and striating of the base composition, to which the colored portions have been applied by the device of FIG. 4, the material is allowed to harden into a highly variegated distinctively ornamental pattern. One of the substantially infinite variety of such patterns which may be achieved by the method of the instant invention is disclosed in FIG. 11 wherein the composition 21 is shown as ornamented by any desired darker colors 90, lighter colors 91 and transitional shades or blends 92.

Since the number of scribing points 30, the number of cutting rollers 70 and the number of points 84 may be suitably varied, in accordance with the desires of the manufacturer or operator, and since any desired colors or color combinations may be used both in the base composition, and in the subsequently applied coloring, it will be readily apparent that an unlimited number and variety of non-repetitious designs of ornamentation may be achieved by the application of the method of decoration of the instant invention to a decorative surface.

From the foregoing it will now be seen that there is herein provided an improved process for decorating ornamental surfaces, as well as specific apparatus by means of which the method of the instant invention may be most expeditiously carried out, which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative and not in a limiting sense .

I claim:

1. A method of decorating a flat surface which comprises the steps of applying a viscous coating to the surface, smoothing the coating, scoring a plurality of irregular lines to a depth equal to the thickness of said coating in the viscous coating and simultaneously applying a coloring material in liquid form of less viscosity and specific gravity than the coating to the bottom of the scored lines.

2. The method of claim 1 wherein the coating is an epoxy resin.

3. A method of applying colored decoration to a flat surface which comprises the steps of applying a viscous coating composition to the surface, simultaneously smoothing and scoring said composition with a plurality of irregular lines subsequently further scoring the coating to a depth equal to the thickness of said coating in an irregular non-repetitious pattern and simultaneously applying color to the bottom of the subsequent scoring, the color being applied by liquid coloring material of less viscosity and specific gravity than the coating composition.

4. A method of applying colored decoration to a flat surface which comprises the steps of applying a viscous coating composition to the surface, simultaneously smoothing and scoring said composition with a plurality of irregular lines, subsequently further scoring the coating to a depth equal to the thickness of said coating in an irregular non-repetitious pattern and simultaneously applying a plurality of colors differing from the coating and differing from each other to the bottom of the subsequent scoring, the colors being applied by liquid coloring material of less viscosity and specific gravity than the coating composition.

5. A method of applying colored decoration to a flat surface which comprises the steps of applying a viscous coating composition to the surface, simultaneously smoothing and scoring said composition with a plurality of irregular lines, subsequently further scoring the coating to a depth equal to the thickness of said coating in an irregular non-repetitious pattern and simultaneously applying a plurality of colors differing from the coating and differing from each other to the bottom of the subsequent scoring, the colors being applied by liquid coloring material of less viscosity and lesser specific gravity than the coating composition.

6. A method of applying colored decoration to a flat surface which comprises the steps of applying a viscous coating composition to the surface, simultaneously smoothing and scoring said composition with a plurality of irregular lines, subsequently further scoring the coating to a depth equal to the thickness of said coating in an irregular non-repetitious pattern, simultaneously applying a plurality of colors differing from the coating and differing from each other to the bottom of the subsequent scoring, the colors being applied by liquid coloring material of less viscosity and lesser specific gravity than the coating composition and subsequently additionally scoring the surface to a depth equal to the thickness of said coating in a plurality of random irregular patterns while the composition is still viscous to further disseminate the colors, and allowing the composition to harden.

7. The method of claim 6 wherein the coating composition is a self-hardening epoxy resin.

8. A method of applying decoration to a surface which comprises the steps of applying a smooth coating of colored viscous material to the surface, scoring the viscous coating to a depth equal to the thickness of said coating in a random non-repetitious pattern and simultaneously applying a plurality of different coloring materials to the bottom of the scored portions, the coloring materials being in liquid form and of lesser viscosity and specific gravity than the coating, and allowing the applied coloring material to diffuse irregularly through and over the surface of the coating as the coating hardens to close the scoring therein.

References Cited in the file of this patent
UNITED STATES PATENTS

| | | |
|---|---|---|
| 199,929 | Nichols | Feb. 5, 1878 |
| 205,004 | Smith | June 18, 1878 |
| 1,144,891 | Cannon | June 29, 1915 |
| 1,198,257 | Morrison | Sept. 12, 1916 |
| 1,844,083 | Weber | Feb. 9, 1932 |
| 1,844,084 | Weber | Feb. 9, 1932 |
| 2,011,182 | Nutting | Aug. 13, 1935 |
| 2,866,720 | Martin et al. | Dec. 30, 1958 |